(12) United States Patent
Tian et al.

(10) Patent No.: US 10,940,462 B2
(45) Date of Patent: Mar. 9, 2021

(54) VANADIUM-BASED CATALYST AND PREPARATION METHOD THEREFOR

(71) Applicants: China Petroleum & Chemical Corporation, Beijing (CN); Sinopec Nanjing Research Institute of Chemical Industry Co., Ltd., Nanging (CN)

(72) Inventors: Xianguo Tian, Nanjing (CN); Shixin Wei, Nanjing (CN); Tianlei Dong, Nanging (CN); Huiqin Yin, Nanging (CN); Tianming Xie, Nanging (CN); Jian He, Nanjing (CN)

(73) Assignees: CHINA PETROLEUM & CHEMICAL CORPORATION, Beijing (CN); SINOPEC NANJING RESEARCH INSTITUTE OF CHEMICAL INDUSTRY CO., LTD, Nanjing (CN)

( * ) Notice: Subject to any disclaimer, the term of this patent is extended or adjusted under 35 U.S.C. 154(b) by 0 days.

(21) Appl. No.: 16/622,448

(22) PCT Filed: Jun. 13, 2017

(86) PCT No.: PCT/CN2017/088011
§ 371 (c)(1),
(2) Date: Dec. 13, 2019

(87) PCT Pub. No.: WO2018/227362
PCT Pub. Date: Dec. 20, 2018

(65) Prior Publication Data
US 2020/0156045 A1    May 21, 2020

(51) Int. Cl.
| | | |
|---|---|---|
| *B01J 23/22* | (2006.01) | |
| *B01J 27/055* | (2006.01) | |
| *B01J 21/08* | (2006.01) | |
| *B01J 27/16* | (2006.01) | |
| *B01J 35/10* | (2006.01) | |
| *B01J 37/04* | (2006.01) | |
| *B01J 37/03* | (2006.01) | |
| *B01J 37/02* | (2006.01) | |
| *B01J 37/00* | (2006.01) | |
| *B01J 37/08* | (2006.01) | |
| *C01B 17/79* | (2006.01) | |

(52) U.S. Cl.
CPC ............ *B01J 23/22* (2013.01); *B01J 21/08* (2013.01); *B01J 27/055* (2013.01); *B01J 27/16* (2013.01); *B01J 35/1066* (2013.01); *B01J 37/0018* (2013.01); *B01J 37/0036* (2013.01); *B01J 37/0221* (2013.01); *B01J 37/031* (2013.01); *B01J 37/04* (2013.01); *B01J 37/08* (2013.01); *C01B 17/79* (2013.01)

(58) Field of Classification Search
CPC ......... C01B 17/69; C01B 17/79; B01D 53/50; B01D 53/8609; B01D 2255/20723; B01D 2255/2022; B01D 2255/2027; B01D 2255/204; B01D 2255/9205; B01J 8/00; B01J 23/02; B01J 23/04; B01J 23/22; B01J 27/14; B01J 35/1066; B01J 37/00; B01J 37/0009; B01J 37/04
See application file for complete search history.

(56) References Cited

U.S. PATENT DOCUMENTS

| | | | | |
|---|---|---|---|---|
| 3,855,386 | A * | 12/1974 | Moore | B01J 35/12 423/210.5 |
| 4,193,894 | A * | 3/1980 | Villadsen | C01B 17/79 423/535 |
| 4,284,530 | A * | 8/1981 | Sherif | B01J 23/22 423/535 |
| 4,294,723 | A * | 10/1981 | Hara | B01J 23/22 423/535 |
| 8,323,610 | B2 * | 12/2012 | Kramer | B01J 27/055 423/533 |

(Continued)

FOREIGN PATENT DOCUMENTS

| | | |
|---|---|---|
| CN | 1478597 A | 3/2004 |
| CN | 101648107 A | 2/2010 |

(Continued)

OTHER PUBLICATIONS

International Search Report of International Application No. PCT/CN2017/088011, dated Mar. 21, 2018.

*Primary Examiner* — Timothy C Vanoy
(74) *Attorney, Agent, or Firm* — Finnegan, Henderson, Farabow, Garrett & Dunner LLP

(57) ABSTRACT

A vanadium-based catalyst comprises an active phase carried on a carrier. The active phase comprises vanadium oxide, potassium sulfate, sodium sulfate, and assistants. The carrier comprises ultra-large-pore silicon dioxide and diatomite, the average pore size of the ultra-large-pore silicon dioxide ranges from 100 nm to 500 nm, and the diatomite is a refined diatomite having a silicon dioxide content of higher than 85% after refinement. The preparation method for the vanadium-based catalyst comprises: 1) mixing potassium vanadium and potassium hydroxide, and allowing a prepared mixed solution and sulfuric acid to carry out a neutralization reaction; and 2) mixing a neutralization reaction product in step 1) with the carrier and sodium sulfate, and carrying out rolling, band extrusion, drying and roasting to prepare the vanadium-based catalyst, assistant compounds being added in step 1) and/or step 2).

15 Claims, No Drawings

(56) References Cited

U.S. PATENT DOCUMENTS

2011/0251052 A1\* 10/2011 Kramer ................. B01J 27/055
  502/218
2018/0104674 A1\* 4/2018 Grune ................. B01J 37/0009

FOREIGN PATENT DOCUMENTS

| CN | 102716756 A | 10/2012 |
| CN | 105792927 A | 7/2016 |
| JP | 2007-14960 A | 1/2007 |

\* cited by examiner

VANADIUM-BASED CATALYST AND PREPARATION METHOD THEREFOR

FIELD OF THE INVENTION

This application is a national stage filing under 35 U.S.C. § 371 of International Application No. PCT/CN2017/0088011, filed on Jun. 13, 2017. The content of this application is incorporated herein by reference.

The present invention relates to the technical field of catalyst preparation, and in particular, to a vanadium-based catalyst and a preparation method therefor.

BACKGROUND OF THE INVENTION

A vanadium catalyst is used in a sulfuric acid producing unit to oxidize $SO_2$ into $SO_3$. The traditional vanadium catalyst is a vanadium-potassium (sodium)-silicon system, with vanadium pentoxide as an active component, potassium sulfate and sodium sulfate as auxiliary agents, and diatomite as a carrier. The vanadium catalyst is loaded into a converter of a sulfuric acid producing unit, to convert $SO_2$ into $SO_3$ at an operating temperature generally required to be higher than 410° C. and not more than 600° C., which is beneficial to the activity of the catalyst and can thus improve the conversion rate of $SO_2$.

At present, the vanadium catalyst is prepared by the following method. A desired mixed solution (referred to as vanadium water) of $KVO_3$ and KOH is prepared by dissolving KOH with steam, and subjecting the dissolved KOH and $V_2O_5$ to a hot boiling condition. The vanadium water is then neutralized with sulfuric acid to obtain a colloidal precipitate of $V_2O_5$ and $K_2SO_4$. After that, the colloidal precipitate, an auxiliary agent, a purified diatomite and so on are added into a mill in a prescribed ratio, uniformly mixed, ground, compressed, and formed into a malleable material, which is then produced into a finished product by extruding, drying, roasting, sieving, and packaging. In the above method, the active component vanadium pentoxide is added in the form of solid or colloidal vanadium pentoxide or ammonium vanadate or ammonium polyvanadate, and is then mixed and ground together with other components; however, it is difficult to use a solid-solid mixture to obtain a material with homogeneously distributed components, which can affect the catalytic efficiency of the active component. In addition, all vanadium sulfate catalysts use diatomite as a carrier, but quality of natural diatomite is very unstable due to geological origin thereof. The pore diameter distribution of natural diatomite is relatively wide (refer to Table 1), and the pore structure thereof is neither stable nor uniform. Therefore, when natural diatomite is used as a carrier to prepare a catalyst, the dispersibility of the active component is not satisfactory. Although treated and purified diatomite can serve as a carrier of a vanadium catalyst, the stability of the performance of the catalyst is still affected due to the natural instability of the diatomite.

TABLE 1

| Pore Diameter Distribution of Natural Diatomite | | | | | | |
|---|---|---|---|---|---|---|
| | Pore diameter range | | | | | |
| | 8-50 nm | 50-100 nm | 100-300 nm | 300-600 nm | 600-900 nm | >900 nm |
| Proportion | 10-15% | 20-25% | 25-30% | 20-25% | 10-15% | 5-10% |

SUMMARY OF THE INVENTION

Directed against the above problems in the existing technologies, the present invention aims to provide a vanadium-based catalyst and a preparation method therefor. By improving the uniformity of distribution of an active component and improving the stability of a carrier, a catalyst having a higher catalytic activity and thermal stability can be produced. The catalyst is especially suitable for the reaction of oxidizing $SO_2$ into $SO_3$, can meet the requirement for total conversion rate of $SO_2$ in production of sulfuric acid, and has a high application value in the production of sulfuric acid.

The present invention, in one aspect, provides a vanadium-based catalyst. The catalyst comprises: an active phase loaded on a carrier. The active phase comprises vanadium oxide, potassium sulfate, sodium sulfate, and an auxiliary agent. The carrier comprises an ultra-large-pore silica and a diatomite, the ultra-large-pore silica having an average pore diameter ranging from 100 to 500 nm, and the diatomite being a purified diatomite having a silica content of more than 85%.

In a preferred embodiment of the present invention, the ultra-large-pore silica has an average pore diameter ranging from 150 to 400 nm.

According to the present invention, the purified diatomite can be obtained by treating a diatomite from a particular region using physical and chemical methods well known in the art. Preferably, the purified diatomite is at least one of Zhejiang diatomite, Yunnan diatomite, and Northeast China diatomite treated using a physical and/or chemical method.

The inventors of the present application have found in their studies that by using the technical solution of combining an ultra-large-pore silica with a diatomite, it is possible to form a carrier having excellent formability and stability as well as a uniform pore diameter and a stable pore structure, and thus to form a catalyst with excellent performance. This is because, on the one hand, the ultra-large-pore silica having a crystal structure can correct the spatial structure of the amorphous diatomite to obtain a carrier having a narrow pore diameter distribution, thereby reducing the effect of the instability of the diatomite on the performance of the catalyst, which helps to improve the loading effect of the active phase on the carrier; on the other hand, the ultra-large-pore silica can also serve as a binder to improve the formability, stability, and strength of the diatomite.

At present, technical specifications of commonly used ultra-large-pore silica are shown in Table 2. It can be seen that the existing ultra-large-pore silica has a particle diameter ranging about from 12 to 50 nm. The ultra-large-pore silica used in the present invention however has an average pore diameter ranging from 100 to 500 nm, preferably from 150 to 400 nm. The ultra-large-pore silica within this pore diameter range is particularly suitable for loading and dispersing an active phase composed of vanadium oxide, potassium sulfate, etc., and thus can be used to prepare a vanadium-based catalyst having excellent catalytic performance

TABLE 2

| | | | Technical Specifications of Ultra-large-pore Silica | | | |
|---|---|---|---|---|---|---|
| Type | Pore volume (ml/g) | Bulk specific weight (g/L) | Pore diameter (A) | Specific surface area (m²/g) | Water content | Original Particle diameter (mesh) |
| Type I | 1.0-1.3 | 350-400 | 120-150 | 330-400 | ≤5% | 80 meshes > 80% |
| Type II | 1.3-1.7 | 300-350 | 150-300 | 290-330 | ≤5% | 80 meshes > 80% |
| Type III | 1.7-2.0 | 250-300 | 300-400 | 250-290 | ≤5% | 80 meshes > 80% |
| Type IV | 2.0-2.5 | 200-250 | 400-500 | 200-250 | ≤5% | 80 meshes > 80% |
| Type V | 2.5-3.0 | 180-220 | >500 | 150-200 | ≤5% | 80 meshes > 80% |

Note:
1 nm = 10 A

In a preferred embodiment of the present invention, the active phase is present in an amount ranging from 30% to 40% by weight, and the carrier is present in an amount ranging from 60% to 70% by weight.

In another preferred embodiment of the present invention, based on a total weight of the vanadium-based catalyst, vanadium oxide is present in an amount ranging from 6.5% to 8.5% by weight; a molar ratio of potassium element to vanadium element is (2.5-4.0):1; the auxiliary agent is present in an amount ranging from 0.5% to 2.0% by weight.

In another preferred embodiment of the invention, the sodium sulfate is present in an amount ranging from 3.0% to 6.0% by weight.

The inventors of the present invention have found in their studies that the low-temperature activity of the catalyst can be improved by including a specific amount of sodium sulfate. If the amount of sodium sulfate is less than 3.0% by weight, the increase in low-temperature activity is insufficient; if the amount of sodium sulfate is more than 6.0% by weight, the low-temperature activity approaches a peak value, and the increase is not significant.

In another preferred embodiment of the present invention, based on the total weight of the vanadium-based catalyst, the ultra-large-pore silica is present in an amount ranging from 8.0% to 20.0% by weight.

The present invention, in another aspect, provides a method for preparing the above vanadium-based catalyst. The method comprises:

1) mixing potassium vanadate and potassium hydroxide to form a mixed solution, and subjecting the mixed solution and a sulfuric acid solution to a neutralization reaction; and 2) mixing a product of the neutralization reaction in step 1) with a carrier and sodium sulfate to form a mixture, and subjecting the mixture to grinding, pressing, extruding, drying, and roasting to prepare a vanadium-based catalyst, the carrier comprising an ultra-large-pore silica and a diatomite, wherein the ultra-large-pore silica has an average pore diameter ranging from 100 to 500 nm, and the diatomite is purified diatomite having a silica content of more than 85%; and wherein an auxiliary compound is added in step 1) and/or step 2).

In a preferred embodiment of the present invention, in step 1), potassium sulfite is added when preparing the mixed solution, and preferably, a molar ratio of potassium sulfite to potassium vanadate is 1:(0.9-1).

According to the present invention, in the case where potassium sulfite is not added, the product of the above neutralization reaction is a colloidal precipitate containing $V_2O_5$ and $K_2SO_4$; in the case where potassium sulfite is added, the pentavalent vanadium is reduced to tetravalent vanadium ion, and thus, the product of the above neutralization reaction is a solution containing $VOSO_4$ and $K_2SO_4$. Compared with the mixing of the colloidal precipitate with the carrier, the mixing of the product in the solution state with the carrier is more sufficient and can thus produce a better loading effect. In addition, potassium sulfite as a reducing agent not only introduces no other components, but also provides potassium as an active component. In comparison with the use of other reducing agents such as gaseous $SO_2$, oxalic acid and the like, the use of potassium sulfite avoids secondary pollution caused by the reduction using $SO_2$ and avoids the high cost of reduction using oxalic acid, and is therefore more advantageous in environmental protection and in reducing pollution and cost.

In a preferred embodiment of the present invention, in the carrier, a weight ratio of the ultra-large-pore silica to the diatomite is (5-40):(60-95), preferably (12-35):(65-88).

The inventors of the present invention have found in their studies that by limiting the weight ratio of the ultra-large-pore silica to the diatomite within the above specific range, it is advantageous to achieve a desirable effect of correcting the diatomite using the ultra-large-pore silica. If the proportion of the ultra-large-pore silica is less than 5%, it cannot achieve the substantive effect of correcting the particle diameter structure and the particle diameter distribution of the diatomite. On the other hand, if the proportion of the ultra-large-pore silica is more than 40%, the formability and stability of the catalyst may be affected.

In another preferred embodiment of the present invention, preparation of the ultra-large-pore silica comprises a step of using colloidal microspheres of polystyrene having a particle diameter ranging from 120 to 550 nm in a silica sol. According to the present invention, the colloidal microspheres of polystyrene having the particle diameter ranging from 120 to 550 nm used in the silica sol are decomposed in a subsequent roasting step, and thus the ultra-large-pore silica having a pore diameter ranging from 100 to 500 nm is formed.

In another preferred embodiment of the present invention, the auxiliary compound is at least one selected from a group consisting of a phosphorus-containing compound and a cesium-containing compound, preferably at least one selected from a group consisting of phosphoric acid, cesium hydroxide, and cesium sulfate.

The inventors of the present application have found in their studies that the use of a specific amount of the phosphorus-containing compound and/or the ruthenium-containing compound as the auxiliary compound can further improve the low-temperature activity of the catalyst.

According to the present invention, when the auxiliary compound is alkaline, it is preferably added in step 1); when the auxiliary compound is acidic, it is optionally added in step 1) or step 2).

The present invention, in still another aspect, provides a method for preparing $SO_3$ by oxidizing $SO_2$. The method comprises: contacting a gas stream containing $SO_2$ with the above described vanadium-based catalyst, to obtain a gaseous product containing $SO_3$.

According to the present invention, the above vanadium-based catalyst can be used in a converter of a sulfuric acid producing unit, for converting $SO_2$ to $SO_3$.

Other features and advantages of the present invention will be set forth in the following description, and will become partially self-evident from the description or be understood upon reading the embodiments. The objectives and other advantages of the present invention will be realized and attained through structures specified in the description, claims, and the accompanying drawings.

DETAILED DESCRIPTION OF THE EMBODIMENTS

The embodiments of the present invention will be described in detail below with reference to examples, by way of which one can fully understand the implementing process as to how the present invention uses technical means to solve technical problems and achieve technical effects and can thus implement the process based on such understandings. It should be noted that, as long as there is no conflict, examples of the present invention and features of the examples may be combined with one another, and technical solutions formed are all within the protection scope of the present invention.

In the following examples, test materials used include:

Northeast China diatomite: CB05 produced by Jilin Changbai Diatomite Co., Ltd.;

Yunnan diatomite: YX04 produced by Yunnan Diatomite Products Factory; and

Zhejiang diatomite: CD02 produced by Shengzhou Huali Diatomite Products Co., Ltd.

In order to meet requirements for the diatomite as a carrier, natural diatomite must be processed to reduce the contents of clay minerals and detrital minerals to increase the proportion of diatom shells. Purified diatomite is usually prepared by subjecting raw diatomite to beating and cyclonic separation, and then treating the resulted diatomite with sulfuric acid.

Other test materials not listed are all commercially available products.

According to the present invention, the average pore diameter is average pore diameter measured and calculated according to a mercury intrusion method (GBT 21650.1 mercury intrusion method and gas adsorption method for measuring pore diameter distribution and porosity of a solid material, Part 1: mercury intrusion method).

PREPARATION EXAMPLE 1

75 g of tetramethoxysilane (TMOS) and 65 g of methanol were added to a 250-mL three-necked flask equipped with a stirrer and a reflux condenser, and stirred well. Hydrochloric acid having a certain concentration was added to the reaction flask, followed by introduction of $N_2$. The resultant mixture was heated to a reflux temperature to react for 2 hours, and finally cooled naturally to room temperature, to obtain a colorless transparent $SiO_2$ sol.

Colloidal microspheres of polystyrene having particle diameters ranging from 260 to 280 nm were immersed in the $SiO_2$ sol for 10 minutes, and subjected to suction filtration. After the suction filtration, the filtered solid was dried at 70° C. for 60 minutes. The above immersion, suction filtration, and drying processes were repeated 3 times. The dried product after treatment was placed in a tube furnace, heated to 300° C. at a rate of 3° C./min under a condition of introducing air and kept at 300° C. for 4 hours, then heated to 600° C. and kept at 600° C. for 3 hours, and finally cooled naturally to obtain an ultra-large-pore silica having an average pore diameter of 240 nm.

PREPARATION EXAMPLE 2

An ultra-large-pore silica was prepared in the same manner as in Preparation Example 1, except that the colloidal microspheres of polystyrene had particle diameters ranging from 170 to 180 nm, and the prepared ultra-large-pore silica had an average pore diameter of 150 nm.

PREPARATION EXAMPLE 3

A transparent $SiO_2$ sol was prepared in a ratio of n(Si(OEt)$_4$):n(EtOH):n(HCl):n(H$_2$O)=1:3.9:0.3:1.8 and with tetraethyl orthosilicate as a silicon source. The $SiO_2$ sol was added dropwise to colloidal microspheres of polystyrene having particle diameters ranging from 320 to 340 nm, and subjected to suction filtration. After the suction filtration, the filtered solid was dried at 60 to 70° C. for 60 minutes, which was repeated several times. The solid, under programmed temperature rise control and under a condition of introducing air, was slowly heated (<5° C./min) to 300° C. and kept at 300° C. for 5 hours, then heated to 570° C. and kept at 570° C. for 5 hours, and finally cooled to obtain an ultra-large-pore silica having an average pore diameter of 300 nm.

PREPARATION EXAMPLE 4

An ultra-large-pore silica was prepared in the same manner as in Preparation Example 3, except that the colloidal microspheres of polystyrene had particle diameters ranging from 420 to 445 nm, and the prepared ultra-large-pore silica had an average pore diameter of 400 nm.

EXAMPLE 1

A mixed solution (referred to as vanadium water) of $KVO_3$ and KOH was prepared by dissolving KOH with steam, and subjecting the dissolved KOH and $V_2O_5$ to a hot boiling condition. The prepared vanadium water had a concentration of $V_2O_5$ being 266 g/L, and a molar ratio of $K_2O/V_2O_5$ being 3.7. Then, 30.1 ml of the vanadium water was neutralized with 17.9 ml of a sulfuric acid solution (the sulfuric acid solution was prepared by mixing concentrated sulfuric acid and water in a volume ratio of being 1:1) to prepare a colloidal precipitate of $V_2O_5$ and $K_2SO_4$. After that, the colloidal precipitate, 3.7 g of $Na_2SO_4$, 1 ml of phosphoric acid, 8.0 g of the ultra-large-pore silica prepared in Preparation Example 1, and 59.8 g of purified Northeast China diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 8.0 wt %; $K_2O/V_2O_5$ was 3.7 (molar ratio); $Na_2SO_4$ was present in an amount of 3.7 wt %; $P_2O_5$ was present in an amount of 1%; the ultra-large-pore silica was present in an amount of 8.0 wt %; and the rest was purified Northeast China diatomite.

EXAMPLE 2

A mixed solution (referred to as vanadium water) of $KVO_3$ and KOH was prepared by dissolving KOH with steam, and subjecting the dissolved KOH and $V_2O_5$ to a hot boiling condition. The prepared vanadium water had a concentration of $V_2O_5$ being 266 g/L, and a molar ratio of $K_2O/V_2O_5$ being 4.0. Then, 28.2 ml of the vanadium water was neutralized with 18.2 ml of a sulfuric acid solution (the sulfuric acid solution was prepared by mixing concentrated sulfuric acid and water in a volume ratio being 1:1) to prepare a colloidal precipitate of $V_2O_5$ and $K_2SO_4$. After that, the colloidal precipitate, 4.1 g of $Na_2SO_4$, 0.9 g of cesium sulfate, 13.0 g of the ultra-large-pore silica prepared in Preparation Example 2, and 52.7 g of purified Yunnan diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 7.5%; $K_2O/V_2O_5$ was 4.0 (molar ratio); $Na_2SO_4$ was present in an amount of 4.1%; cesium sulfate was present in an amount of 0.9%; the ultra-large-pore silica was present in an amount of 13.0%; and the rest was purified Yunnan diatomite.

EXAMPLE 3

A mixed solution (referred to as vanadium water) of $KVO_3$ and KOH was prepared by dissolving KOH with steam, and subjecting the dissolved KOH and $V_2O_5$ to a hot boiling condition. The prepared vanadium water had a concentration of $V_2O_5$ being 266 g/L, and a molar ratio of $K_2O/V_2O_5$ being 3.5. Then, 30.8 ml of the vanadium water was neutralized with 17.4 ml of a sulfuric acid solution (the sulfuric acid solution was prepared by mixing concentrated sulfuric acid and water in a volume ratio being 1:1) to prepare a colloidal precipitate of $V_2O_5$ and $K_2SO_4$. After that, the colloidal precipitate, 5.5 g of $Na_2SO_4$, 1 ml of phosphoric acid, 18.0 g of the ultra-large-pore silica prepared in Preparation Example 3, and 47.0 g of purified Zhejiang diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 8.2 wt %; $K_2O/V_2O_5$ was 3.5 (molar ratio); $Na_2SO_4$ was present in an amount of 5.5 wt %; $P_2O_5$ was present in an amount of 1 wt %; the ultra-large-pore silica was present in an amount of 18.0%; and the rest was purified Zhejiang diatomite.

EXAMPLE 4

A mixed solution (referred to as vanadium water) of $KVO_3$ and KOH was prepared by dissolving KOH with steam, and subjecting the dissolved KOH and $V_2O_5$ to a hot boiling condition. The prepared vanadium water had a concentration of $V_2O_5$ being 266 g/L, and a molar ratio of $K_2O/V_2O_5$ being 3.8. Then, 29.3 ml of the vanadium water was mixed uniformly with 1.5 g of cesium hydroxide. The resultant mixture was neutralized with 19.1 ml of a sulfuric acid solution (the sulfuric acid solution was prepared by mixing concentrated sulfuric acid and water in a volume ratio being 1:1) to prepare a colloidal precipitate of $V_2O_5$ and $K_2SO_4$. After that, the colloidal precipitate, 3.1 g of $Na_2SO_4$, 10.6 g of the ultra-large-pore silica prepared in Preparation Example 4, and 55.5 g of purified Northeast China diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 7.8 wt %; $K_2O/V_2O_5$ was 3.8 (molar ratio); $Na_2SO_4$ was present in an amount of 3.1 wt %; cesium sulfate was present in an amount of 1.8 wt %; the ultra-large-pore silica was present in an amount of 10.6 wt %; and the rest was purified Northeast China diatomite.

EXAMPLE 5

A mixed solution (referred to as vanadium water) of $KVO_3$ and KOH was prepared by dissolving KOH with steam, and subjecting the dissolved KOH and $V_2O_5$ to a hot boiling condition. 71.2 g of potassium sulfite was added to the vanadium water and dissolved to obtain vanadium water having a concentration of $V_2O_5$ being 266 g/L, and a molar ratio of $K_2O/V_2O_5$ being 3.5. Then, 30.8 ml of the vanadium water was neutralized with 22.4 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 5.5 g of $Na_2SO_4$, 1 ml of phosphoric acid, 18.0 g of the ultra-large-pore silica prepared in Preparation Example 1, and 47.0 g of purified Zhejiang diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 8.2 wt %; $K_2O/V_2O_5$ was 3.5 (molar ratio); $Na_2SO_4$ was present in an amount of 5.5 wt %; $P_2O_5$ was present in an amount of 1 wt %; the ultra-large-pore silica was present in an amount of 18.0 wt %; and the rest was purified Zhejiang diatomite.

EXAMPLE 6

A mixed solution (referred to as vanadium water) of $KVO_3$ and KOH was prepared by dissolving KOH with steam, and subjecting the dissolved KOH and $V_2O_5$ to a hot boiling condition. 67.7 g of potassium sulfite was added to the vanadium water and dissolved to obtain vanadium water having a concentration of $V_2O_5$ being 266 g/L, and a molar ratio of $K_2O/V_2O_5$ being 3.2. Then, 29.3 ml of the vanadium water was neutralized with 19.9 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 6.0 g of $Na_2SO_4$, 1 ml of phosphoric acid, 11.2 g of the ultra-large-pore silica prepared in Preparation Example 2, and 58.8 g of purified Northeast China diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 7.8 wt %; $K_2O/V_2O_5$ was 3.2 (molar ratio); $Na_2SO_4$ was present in an amount of 6.0 wt %; $P_2O_5$ was present in an amount of 1 wt %; the ultra-large-pore silica was present in an amount of 11.2 wt %; and the rest was purified Northeast China diatomite.

EXAMPLE 7

A mixed solution (referred to as vanadium water) of $KVO_3$ and KOH was prepared by dissolving KOH with steam, and subjecting the dissolved KOH and $V_2O_5$ to a hot boiling condition. 69.5 g of potassium sulfite was added to the vanadium water and dissolved to obtain vanadium water having a concentration of $V_2O_5$ being 266 g/L, and a molar ratio of $K_2O/V_2O_5$ being 3.7. Then, 30.1 ml of the vanadium water was neutralized with 22.8 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 3.7 g of $Na_2SO_4$, 1.6 g of cesium sulfate, 8.0 g of the ultra-large-pore silica prepared in Preparation Example 1, and 57.9 g of purified Northeast China diatomite were added to a mill, uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 8.0 wt %; $K_2O/V_2O_5$ was 3.7 (molar ratio); $Na_2SO_4$ was present in an amount of 3.7 wt %; cesium sulfate was present in an amount of 1.6 wt %; the ultra-large-pore silica was present in an amount of 8.0 wt %; and the rest was purified Northeast China diatomite.

COMPARATIVE EXAMPLE 1

A mixed solution (referred to as vanadium water) of $KVO_3$ and KOH was prepared by dissolving KOH with steam, and subjecting the dissolved KOH and $V_2O_5$ to a hot boiling condition. The prepared vanadium water had a concentration of $V_2O_5$ being 266 g/L, and a molar ratio of $K_2O/V_2O_5$ being 2.7. Then, 30.1 ml of the vanadium water was neutralized with 13.1 ml of a sulfuric acid solution (the sulfuric acid solution was prepared by mixing concentrated sulfuric acid and water in a volume ratio being 1:1) to prepare a colloidal precipitate of $V_2O_5$ and $K_2SO_4$. After that, the colloidal precipitate and 82.0 g of purified Northeast China diatomite were added to a mill and uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 8.0 wt %; $K_2O/V_2O_5$ was 2.7 (molar ratio); and the rest was purified Northeast China diatomite.

COMPARATIVE EXAMPLE 2

A mixed solution (referred to as vanadium water) of $KVO_3$ and KOH was prepared by dissolving KOH with steam, and subjecting the dissolved KOH and $V_2O_5$ to a hot boiling condition. 69.5 g of potassium sulfite was added to the vanadium water and dissolved to obtain vanadium water having a concentration of $V_2O_5$ being 266 g/L, and a molar ratio of $K_2O/V_2O_5$ being 2.7. Then, 30.1 ml of the vanadium water was neutralized with 18.0 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution and 82.0 g of purified Northeast China diatomite were added to a mill and uniformly mixed, followed by addition of water. The mixture was ground and pressed to form a malleable material, which was then subjected to extruding, drying, and roasting to produce 100 g of a vanadium-based catalyst.

In the vanadium-based catalyst, $V_2O_5$ was present in an amount of 8.0 wt %; $K_2O/V_2O_5$ was 2.7 (molar ratio); and the rest was purified Northeast China diatomite.

COMPARATIVE EXAMPLE 3

A mixed solution (referred to as vanadium water) of $KVO_3$ and KOH was prepared by dissolving KOH with steam, and subjecting the dissolved KOH and $V_2O_5$ to a hot boiling condition. 65.1 g of potassium sulfite was added to the vanadium water and dissolved to obtain vanadium water having a concentration of $V_2O_5$ being 266 g/L, and a molar ratio of $K_2O/V_2O_5$ being 3.5. Then, 28.2 ml of the vanadium water was neutralized with 20.5 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 3.5 g of $Na_2SO_4$, 1 ml of phosphoric acid, and 73.5 g of purified Yunnan diatomite were added to a mill and uniformly mixed, followed by addition of water. The mixture was ground and pressed to form a malleable material, which was then subjected to extruding, drying and roasting to produce 100 g of a vanadium-based catalyst.

In the vanadium-based catalyst, $V_2O_5$ was present in an amount of 7.5 wt %; $K_2O/V_2O_5$ was 3.5 (molar ratio); $Na_2SO_4$ was present in an amount of 3.5 wt %; $P_2O_5$ was present in an amount of 1 wt %; and the rest was purified Yunnan diatomite.

COMPARATIVE EXAMPLE 4

A mixed solution (referred to as vanadium water) of $KVO_3$ and KOH was prepared by dissolving KOH with steam, and subjecting the dissolved KOH and $V_2O_5$ to a hot boiling condition. After dissolution, the resultant vanadium water had a concentration of $V_2O_5$ being 266 g/L, and a molar ratio of $K_2O/V_2O_5$ being 2.7. Then, 30.1 ml of the vanadium water was neutralized with 13.1 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 1.5 g of $Na_2SO_4$, and 80.3 g of purified Zhejiang diatomite were added to a mill and uniformly mixed, followed by addition of water. The mixture was ground and pressed to form a malleable material, which was then subjected to extruding, drying and roasting to produce 100 g of a vanadium-based catalyst.

In the vanadium-based catalyst, $V_2O_5$ was present in an amount of 8.0 wt %; $K_2O/V_2O_5$ was 2.7 (molar ratio); $Na_2SO_4$ was present in an amount of 1.5 wt %; and the rest was purified Zhejiang diatomite.

COMPARATIVE EXAMPLE 5

A mixed solution (referred to as vanadium water) of $KVO_3$ and KOH was prepared by dissolving KOH with steam, and subjecting the dissolved KOH and $V_2O_5$ to a hot boiling condition. 67.7 g of potassium sulfite was added to the vanadium water and dissolved to obtain vanadium water having a concentration of $V_2O_5$ being 266 g/L, and a molar ratio of $K_2O/V_2O_5$ being 3.2. Then, 29.3 ml of the vanadium water was neutralized with 19.9 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 6.0 g of $Na_2SO_4$, 1 ml of phosphoric acid, 5.0 g of the ultra-large-pore silica prepared in Preparation Example 1, and 65.9 g of purified Northeast China diatomite were added to a mill and uniformly mixed, followed by addition of water. The mixture was ground and pressed to form a malleable material, which was then subjected to extruding, drying and roasting to produce 100 g of a vanadium-based catalyst.

In the vanadium-based catalyst, $V_2O_5$ was present in an amount of 7.8 wt %; $K_2O/V_2O_5$ was 3.2 (molar ratio); $Na_2SO_4$ was present in an amount of 6.0 wt %; $P_2O_5$ was present in an amount of 1 wt %; the ultra-large-pore silica was present in an amount of 5.0 wt %; and the rest was purified Northeast China diatomite.

COMPARATIVE EXAMPLE 6

A mixed solution (referred to as vanadium water) of $KVO_3$ and KOH was prepared by dissolving KOH with steam, and subjecting the dissolved KOH and $V_2O_5$ to a hot boiling condition. 67.7 g of potassium sulfite was added to the vanadium water and dissolved to obtain vanadium water having a concentration of $V_2O_5$ being 266 g/L, and a molar ratio of $K_2O/V_2O_5$ being 3.2. Then, 29.3 ml of the vanadium water was neutralized with 19.9 ml of a sulfuric acid solution (the sulfuric acid solution was prepared by mixing concentrated sulfuric acid and water in a volume ratio being 1:1) to prepare a mixed solution of $VOSO_4$ and $K_2SO_4$. After that, the mixed solution, 6.0 g of $Na_2SO_4$, 1 ml of phosphoric acid, 11.2 g of large-pore silica (Type: Type IV; pore diameter: 40 to 50 nm), and 58.8 g of purified Northeast China diatomite were added to a mill and uniformly mixed, followed by addition of water. The mixture was ground and pressed to form a malleable material, which was then subjected to extruding, drying and roasting to produce 100 g of a vanadium-based catalyst.

In the vanadium-based catalyst, $V_2O_5$ was present in an amount of 7.8 wt %; $K_2O/V_2O_5$ was 3.2 (molar ratio); $Na_2SO_4$ was present in an amount of 6.0 wt %; $P_2O_5$ was present in an amount of 1 wt %; the large-pore silica was present in an amount of 11.2 wt %; and the rest was purified Northeast China diatomite.

COMPARATIVE EXAMPLE 7

A mixed solution (referred to as vanadium water) of $KVO_3$ and KOH was prepared by dissolving KOH with steam, and subjecting the dissolved KOH and $V_2O_5$ to a hot boiling condition. After dissolution, the resultant vanadium water had a concentration of $V_2O_5$ being 266 g/L, and a molar ratio of $K_2O/V_2O_5$ being 3.2. Then, 30.1 ml of the vanadium water was neutralized with 15.5 ml of a sulfuric acid solution (the sulfuric acid solution was prepared by mixing concentrated sulfuric acid and water in a volume ratio being 1:1) to prepare a colloidal precipitate of $V_2O_5$ and $K_2SO_4$. After that, the colloidal precipitate, 1 ml of phosphoric acid, and 67.5 g of the ultra-large-pore silica prepared in Preparation Example 1 were added to a mill and uniformly mixed, followed by addition of water. The mixture was ground and pressed to form a malleable material, which was then subjected to extruding, drying and roasting to produce 100 g of a vanadium-based catalyst.

In the vanadium-based catalyst, $V_2O_5$ was present in an amount of 8.0 wt %; $K_2O/V_2O_5$ was 3.2 (molar ratio); $P_2O_5$ was present in an amount of 1 wt %; and the rest was the ultra-large-pore silica.

COMPARATIVE EXAMPLE 8

A mixed solution (referred to as vanadium water) of $KVO_3$ and KOH was prepared by dissolving KOH with steam, and subjecting the dissolved KOH and $V_2O_5$ to a hot boiling condition. After dissolution, the resultant vanadium water had a concentration of $V_2O_5$ being 266 g/L, and a molar ratio of $K_2O/V_2O_5$ being 3.2. Then, 28.2 ml of the vanadium water was neutralized with 14.6 ml of a sulfuric acid solution (the sulfuric acid solution was prepared by mixing concentrated sulfuric acid and water in a volume ratio being 1:1) to prepare a colloidal precipitate of $V_2O_5$ and $K_2SO_4$. After that, the colloidal precipitate, 6.0 g of $Na_2SO_4$, 1 ml of phosphoric acid, 30.0 g of the ultra-large-pore silica prepared in Preparation Example 1, and 38.6 g of purified Yunnan diatomite were added to a mill and uniformly mixed, followed by addition of water. The mixture was ground and pressed to form a malleable material, which was then subjected to extruding, drying and roasting to produce 100 g of a vanadium-based catalyst.

In the vanadium-based catalyst, $V_2O_5$ was present in an amount of 7.5 wt %; $K_2O/V_2O_5$ was 3.2 (molar ratio); $Na_2SO_4$ was present in an amount of 6.0 wt %; $P_2O_5$ was present in an amount of 1 wt %; the ultra-large-pore silica was present in an amount of 30.0 wt %; and the rest was the purified Yunnan diatomite.

TEST EXAMPLE 1

The catalysts prepared in the above examples and comparative examples were prepared into catalyst samples having a particle diameter φ of 5×5 to 8 mm, and subjected to activity tests under the following conditions. The activity was expressed by the conversion rate of $SO_2$. Results of the tests are shown in Table 3.

The value of the conversion rate E of $SO_2$ was expressed in %, and was calculated according to the following formula:

$$E = \frac{\varphi_1 - \varphi_2}{\varphi_1(1 - 0.015\varphi_2)} \times 100$$

In the formula, φ1 is the value of the volume fraction of sulfur dioxide in the gas at the inlet of the reactor, and is expressed in %; φ2 is the value of the volume fraction of sulfur dioxide in the gas at the outlet of the reactor, and is expressed in %.

Converter: The converter used was a jacketed single-tube reactor having a tube diameter φ of 36×2 mm. A temperature thermocouple shell was located at a center of the converter. The temperature thermocouple shell had a diameter φ of 8×1.5 mm.

Amount of catalyst loaded: 30 ml;

Space velocity: 3600 h;

Volume percentage of intake $SO_2$: 10%; and the rest was air;

System pressure: atmospheric pressure;

Temperature of activity test: 440° C.

TEST EXAMPLE 2

The strength was measured in accordance with HG/T 2782 Measurement of Crush Resistance of Fertilizer Catalyst Particles.

TABLE 3

Results of Activity Tests

| Samples | Activity (Conversion rate of SO$_2$) % | Strength (N/cm) |
|---|---|---|
| Example 1 | 67.8 | 75 |
| Example 2 | 64.2 | 70 |
| Example 3 | 63.6 | 68 |
| Example 4 | 64.5 | 66 |
| Example 5 | 65.0 | 69 |
| Example 6 | 65.5 | 71 |
| Example 7 | 67.5 | 72 |
| Comparative Example 1 | 55.0 | 52 |
| Comparative Example 2 | 58.8 | 57 |
| Comparative Example 3 | 60.4 | 60 |
| Comparative Example 4 | 56.4 | 54 |
| Comparative Example 5 | 60.6 | 64 |
| Comparative Example 6 | 59.8 | 61 |
| Comparative Example 7 | 51.2 | 35 |
| Comparative Example 8 | 56.1 | 48 |

As can be seen from Table 3, the vanadium catalysts prepared by the method of the present invention have a distinctly higher activity than the traditional vanadium-based catalysts, and can improve the conversion rate of SO$_2$ when used in a converter of a sulfuric acid producing unit, thus satisfying the requirement for total conversion rate of SO$_2$ in sulfuric acid production.

While the embodiments of the present invention have been described as above, the described embodiments are merely for the purpose of understanding the present invention and are not intended to limit the present invention. Various modifications and variations in the form and details of the embodiments may be made by those skilled in the art without departing from the spirit and scope of the present invention. The protection scope of the present invention however is still subject to the scope defined by the appended claims.

The invention claimed is:

1. A vanadium-based catalyst, comprising: an active phase loaded on a carrier, wherein the active phase comprises vanadium oxide, potassium sulfate, sodium sulfate, and an auxiliary agent, and the carrier comprises an ultra-large-pore silica and a diatomite, wherein the ultra-large-pore silica has an average pore diameter ranging from 100 to 500 nm, and the diatomite is a purified diatomite having a silica content of more than 85%.

2. The vanadium-based catalyst according to claim 1, wherein the ultra-large-pore silica has an average pore diameter ranging from 150 to 400 nm.

3. The vanadium-based catalyst according to claim 1, wherein the active phase is present in an amount ranging from 30% to 40% by weight, and the carrier is present in an amount ranging from 60% to 70% by weight.

4. The vanadium-based catalyst according to claim 1, wherein based on a total weight of the vanadium-based catalyst, vanadium oxide is present in an amount ranging from 6.5% to 8.5% by weight; a molar ratio of potassium element to vanadium element is (2.5-4.0):1; the auxiliary agent is present in an amount ranging from 0.5% to 2.0% by weight; and sodium sulfate is present in an amount ranging from 3.0% to 6.0% by weight.

5. The vanadium-based catalyst according to claim 1, wherein based on a total weight of the vanadium-based catalyst, the ultra-large-pore silica is present in an amount ranging from 8.0% to 20.0% by weight.

6. A method for preparing a vanadium-based catalyst according to claim 1, comprising steps of:
1) mixing potassium vanadate and potassium hydroxide to form a mixed solution, and subjecting the mixed solution and sulfuric acid to a neutralization reaction; and
2) mixing a product of the neutralization reaction in step 1) with a carrier and sodium sulfate to form a mixture, and subjecting the mixture to grinding, pressing, extruding, drying, and roasting to prepare a vanadium-based catalyst, the carrier comprising an ultra-large-pore silica and a diatomite,
wherein the ultra-large-pore silica has an average pore diameter ranging from 100 to 500 nm, and the diatomite is purified diatomite having a silica content of more than 85%; and
wherein an auxiliary compound is added in step 1) and/or step 2).

7. The method according to claim 6, wherein in step 1), potassium sulfite is added in preparing the mixed solution.

8. The method according to claim 7, wherein the molar ratio of potassium sulfite to potassium vanadate is in a range of 1:(0.9-1).

9. The method according to claim 6, wherein in the carrier, the weight ratio of the ultra-large-pore silica to the diatomite is in a range of (6-20):(40-55).

10. The method according to claim 9, wherein in the carrier, the weight ratio of the ultra-large-pore silica to the diatomite is in a range of (8-18):(40-52).

11. The method according to claim 6, wherein preparation of the ultra-large-pore silica comprises a step of using colloidal microspheres of polystyrene having a particle diameter ranging from 120 to 550 nm in a silica sol.

12. The method according to any claim 6, wherein the auxiliary compound is at least one selected from a group consisting of a phosphorus-containing compound and a cesium-containing compound.

13. The method according to claim 12, wherein the auxiliary compound is at least one selected from a group consisting of phosphoric acid, cesium hydroxide, and cesium sulfate.

14. A method for preparing SO$_3$ by oxidizing SO$_2$, comprising: contacting a gas stream containing SO$_2$ with a catalyst according to claim 1, to obtain a gaseous product containing SO$_3$.

15. A method for preparing SO$_3$ by oxidizing SO$_2$, comprising: contacting a gas stream containing SO$_2$ with a catalyst prepared according to the method of claim 6, to obtain a gaseous product containing SO$_3$.

* * * * *

UNITED STATES PATENT AND TRADEMARK OFFICE
CERTIFICATE OF CORRECTION

Page 1 of 1

PATENT NO. : 10,940,462 B2
APPLICATION NO. : 16/622448
DATED : March 9, 2021
INVENTOR(S) : Xianguo Tian et al.

It is certified that error appears in the above-identified patent and that said Letters Patent is hereby corrected as shown below:

In the Claims

Claim 12, Column 14, Line 45, "The method according to any claim 6" should read --The method according to claim 6--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*